June 30, 1964 A. C. RUGE 3,139,598
ELECTRICAL PRESSURE TRANSDUCER
Filed Aug. 1, 1961
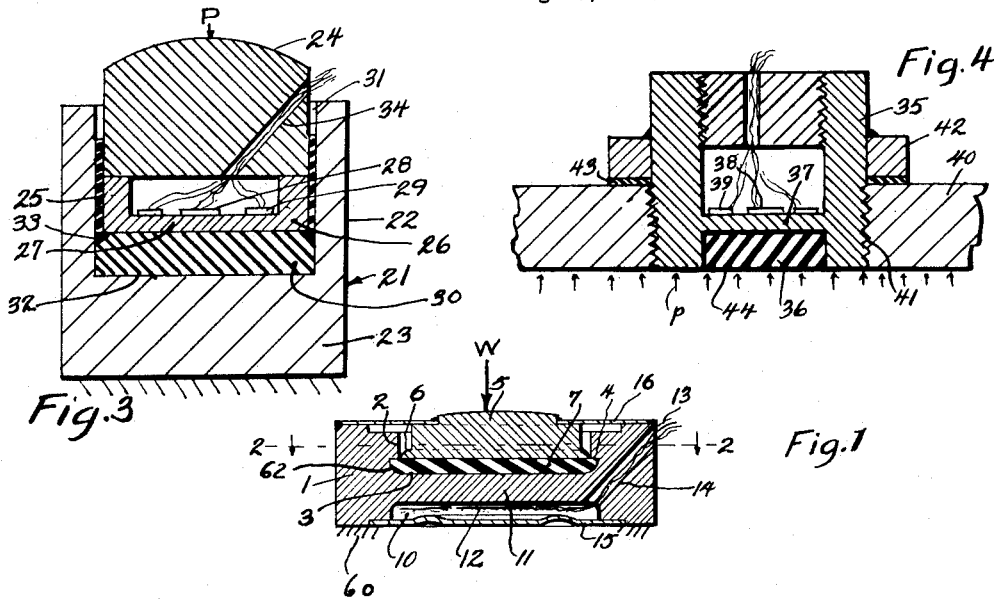
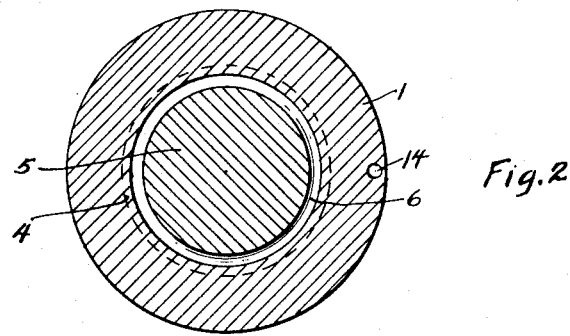
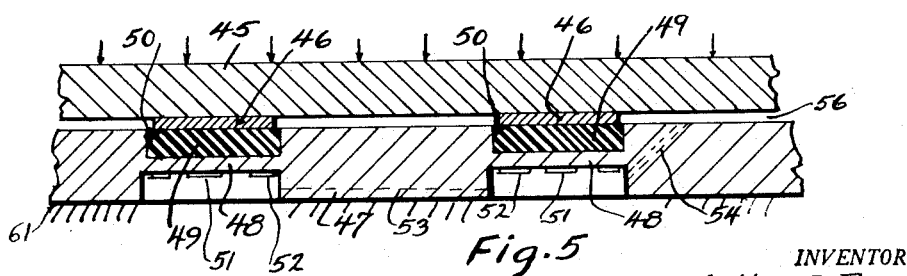
INVENTOR.
Arthur C. Ruge
BY
Attorney

United States Patent Office 3,139,598
Patented June 30, 1964

3,139,598
ELECTRICAL PRESSURE TRANSDUCER
Arthur C. Ruge, Lexington, Mass., assignor to Baldwin-Lima-Hamilton Corporation, a corporation of Pennsylvania
Filed Aug. 1, 1961, Ser. No. 128,470
6 Claims. (Cl. 338—4)

This invention relates to force measuring cells of a type employing electrical strain-responsive means and, particularly, to miniaturized cells.

A great many types of electrically-responsive force measuring cells have been proposed and used but they have been of relatively large size which has been necessary in order to obtain reasonably accurate strain-responsive characteristics and also have sufficient structural strength to resist eccentric loads and lateral forces. The electrically-responsive means is normally in the form of strain gages preferably of the type having electrical resistance filaments bonded throughout their effective length to the surface of a column or other such load-carrying member which is strained in response to load applied to it. The relatively large load cells have prevented their effective use in extremely small spaces.

It is an object of my invention to provide an improved electrically-responsive load cell that can be effectively made in miniaturized form and which will minimize eccentric load and lateral force effects, while still obtaining reasonably satisfactory strain characteristics.

Another object is to provide an improved load cell in the form of a flush-mounting fluid pressure responsive device embodying the principles of my present invention.

A further object is to provide such an improved type of load cell that is relatively simple in construction, operation, and maintenance.

Other objects and advantages will be more apparent to those skilled in the art from the following description of the accompanying drawings in which:

FIG. 1 is a cross-sectional view of a preferred embodiment of my improved force measuring cell;

FIG. 2 is a horizontal view taken substantially on the line 2—2 of FIG. 1;

FIG. 3 is a cross-sectional view of another embodiment of my improved load cell;

FIG. 4 is a cross-sectional view of a flush-mounting fluid pressure responsive device embodying the principles of my present invention.

FIG. 5 is a cross-sectional view of a load measuring device employing a multiplicity of my improved force measuring cells.

In the particular embodiment of my invention shown in FIG. 1 I provide a casing 1 preferably circular in plan view as shown in FIG. 2 and having an axial bore 2 terminating in a closed bottom 3 formed with an annular recess 62 so as to provide a small overhanging ledge 4. A load button 5 extends into bore 2 in radially spaced relation thereto except at its lower end where the button has a flange 6 that has a close sliding fit with the bore. Disposed within the resulting cavity between members 5 and 1 is a hydrostatic pressure pad 7 made of rubber or rubber-like material, the pad completely filling the cavity. The button 5 rests upon this pad and is preferably cemented thereto with any suitable cement. The result is that the pad 7 entirely fills the corresponding space defined by the button and casing surfaces, and under these circumstances the rubber is completely confined so that it acts as though it were a liquid which is capable of transmitting hydrostatic pressure to member 11. I utilize this function to transmit a concentrated load force W from the button and distribute such force uniformly over the bottom of casing 1, which acts as an annular diaphragm 11. I am then able to apply strain gages to the diaphragm as diagrammatically indicated at 12 to measure the load. Hence, the load cell can be quite small for a relatively large load as the load force is effectively distributed over the large diaphragm area. The strain gages are preferably of the bonded electrical resistance filament type well known in the art and are arranged at the central and peripheral portions of the diaphragm on the same side thereof as in the general manner shown in my Patent No. 2,400,467, thereby to take advantage of the tension force in the diaphragm at its central portion and the compression force at the peripheral portion. Leads 13 for these various gages extend through a suitable opening 14 in the casing. The diaphragm 11 is preferably slightly raised above the support 60 by forming a recess 10 at the bottom of the casing thereby insuring freedom of flexure of the diaphragm as well as providing a pocket in which the gages may be protected by a suitable cover 15 extending over the flexure of the diaphragm as well as providing a pocket in which the gages may be protected by a suitable cover 15 extending over the recess 10. The button 5 is centered by an annular metal diaphragm 16 suitably welded at its inner edge to the button and at its outer edge to the casing 1. While this diaphragm resists eccentric loads to a certain extent, yet the rubber pad 7 by operating in the manner of hydrostatic pressure will allow the load button 5 to slightly tilt when subjected to an eccentric load, and yet transmit only a substantially true axial force uniformly over the whole diaphragm area.

My improved load cell is so effective for carrying and measuring a relatively large load for its size that it allows a high degree of miniaturization. As one example, it has been made with a maximum diameter of ⅝" and ⅜" height for a normal load capacity of 3000 lbs., and an overload capacity of 9000 lbs. It is possible to achieve factors such as hysteresis, non-linearity, and repeatability within ½%. Combined with this extraordinary ability for miniaturization with effective functional characteristics is the fact that the cell is relatively economical in manufacture and maintenance.

The embodiment shown in FIG. 3 is illustrative of a design actually employed in a load cell which was built for a 50,000# working load. Casing 21 combines a containing wall 22 and a base 23 and is provided with a cavity 31 in which is placed a load receiving and transmitting member 24 in the form of a plug which bears directly against the rim 25 of a diaphragm type pressure sensing means made in the form of a cup 26, the periphery of which is preferably circular but may have other shapes as square, oval, etc. The sensing diaphragm 27 carries on its upper surface suitable strain gages 28, 29 which are preferably arranged in accordance with the teaching of my Patent No. 2,400,467. Element 26 bears directly against a rubber or rubber-like pressure transmitting pad 30 which is closely fitted or molded into a cavity bounded by the lower surface of member 26 and the walls of cavity 31 so that the pad is constrained against flow or distortion in directions parallel to the lower face of element 26 and so that any pressure exerted against the lower face 32 of the pad is transmitted to diaphragm 27 substantially hydrostatically.

Application of a load P therefore causes a pressure to act on surface 32 of pad 30, thereby transmitting a substantially hydrostatic pressure proportional to P to act against diaphragm 27, causing flexure strains at the surface where gages 28 and 29 are installed. In order to prevent "flow" of the rubber out through the space around the periphery of member 26, restraining rings 33 are preferably employed, in accordance with the teaching of Hines Patent No. 2,868,570. Alternatively, the clearances involved could be made sufficiently small to prevent such flow. Centering guides 25 are preferably made of rubber or plastic to minimize frictional forces during operation and to resist lateral and eccentric load effects.

Members 24 and 26 may be connected together by screws or the like and the joint between them is preferably hermetically sealed as by soldering to prevent moisture and corrosive elements from reaching the strain gages. Lead wires from the gages may be brought out through a hole 34 which preferably terminates in a conventional hermetically sealed external connection not shown.

Among the advantages of this construction are (1) simple and inexpensive machining and assembly, (2) small overall size as compared with other electrical load cells of like accuracy and capacity, (3) very small deflection in response to applied load, (4) by substituting different members 27 the same basic load cell can be used to cover a wide variety of load ranges with full sensitivity, thus greatly simplifying stocking of parts by the manufacturer.

Where the term "rubber" or "rubber-like" is used the reference is to a material which is normally a rubbery solid, relatively incompressible, and capable of transmitting pressures in a substantially hydrostatic manner when constrained so as to prevent its "flowing" or distorting in response to stresses other than substantially hydro-static stress.

FIG. 4 shows an embodiment of the invention in a flush-mounting fluid pressure cell. A casing 35 has a cavity at the lower end which is completely filled by a rubber-like pressure transmitting pad 36 which is constrained around its periphery by casing 35 and at its upper face by the lower surface of a pressure-sensing diaphragm 37. Pad 36 is preferably cemented or otherwise held in position to prevent falling out. Strain gages 38, 39 are attached to the upper face of diaphragm 37 to be responsive to the pressure-induced strains therein. The unit is mounted into a pressure vessel wall 40 by means of threads 41, flanges 42, and gasket 43, preferably so that the lower face of pad 36 is flush with the inside of the vessel wall if maximum frequency response is desired. Fluid pressure "p" acts against surface 44 of the pressure transmitting pad which transmits it hydrostatically to diaphragm 37, so that the response of strain gages 38, 39 directly measures pressure "p."

The advantages of this arrangement as against that of exposing the lower face of diaphragm 37 directly to the fluid in the vessel are (1) the rubber forms a thermal insulation to protect the diaphragm and its gages from excessive temperature or temperature changes which would distort the measurement if not damage the cell, (2) the diaphragm is protected from corrosive or abrasive pressure media, (3) the pad 36, if damaged or destroyed, is readily replaced without affecting the rest of the device. One practical application of such a device is to the measurement of pressure inside the burning chamber of a solid-propellant rocket where both high temperature and corrosion are very serious factors. Rubber-like materials are available for a pad 36 of suitable thickness which can withstand these conditions for the duration of a firing without damaging or excessively heating diaphragm 37. The pad is preferably a simple molded member which is readily replaced after its useful life is over.

FIG. 5 illustrates schematically an embodiment of the invention in a load cell adapted to measure the value of a load which is spread out over a substantial area in some unknown or unpredictable pattern, the height requirement of the cell being severely limited. Here, a load receiving and transmitting member 45 may take the form of a flat relatively thin plate which transmits its total load to a multiplicity of spaced force measuring cells through bearing blocks or plates 46 which are attached to or integral with 45, or otherwise kept in place. A lower plate 47 is provided with a multiplicity of pressure responsive diaphragms 48 which are preferably but not necessarily integral with it. Pressure transmitting rubber-like pads 49 are fitted into a cavity bounded above by the bearing plate 46, at its edges by the walls of a hole bored into plate 47, and at the lower surface by diaphragm 48. Retaining rings 50 prevent extrusion of the rubber under pressure the same as rings 33 of FIG. 1.

Strain gages 51, 52 serve to measure the surface strains in diaphragm 48 due to the pressure applied thereto through the agency of plate 46 and pad 49 and so to measure that portion of the total load acting on plate 45 which is supported by plate 46. The diaphragm 48 may be recessed from the base support 61 as shown for convenience in protecting the gages and wiring and the wires may be brought out through grooves 53 cut in the bottom of plate 47 or passed through holes 54 to space 56. By well-known and conventional means the responses of all the sensing elements are electrically added together to form a single output proportional to the total load acting normal to upper plate 45.

A particular example of the usefulness of this device is in the measuring of vehicular wheel loads where a truck wheel is rolled onto the scale which as a practical matter must be of very small height. The distribution of load occurs over a relatively large area and the distribution in any given case is totally unknown. In addition, the location of the wheel on the scale is not under close control. Such a scale can readily be built to have a surface area of, say, 25" x 40" and an overall height of less than 1".

Another practical application is to the measurement of rolling mill bearing loads where the available height for the cell may be as small as an inch, the heavy load being unevenly distributed over an area of a square foot or more.

It will, of course, be understood that various changes in details of construction and arrangement of parts may be made by those skilled in the art without departing from the spirit of the invention as set forth in the appended claims.

I claim:

1. A transducer comprising, in combination, a flexible elastic diaphragm, means for supporting it around its periphery, a solid body having rubberlike mechanical properties and having a portion of its outer surface in intimate contact with the whole of one face of said diaphragm, said body having a second portion of its outer surface adapted to be exposed to an externally applied pressure the magnitude of which is to be measured, means cooperating with said supporting means for confining said body against plastic flow in any direction so that the rubberlike properties of said body are utilized for transmitting a substantially hydrostatic pressure to said diaphragm face upon application of said externally applied pressure, said supporting means being adapted to support said diaphragm against said substantially hydrostatic pressure while allowing it to flex freely in response thereto, electrical strain gage means responsive to the surface strain on a face of said diaphragm resulting from such flexing, thereby to provide an electrical measurement responsive to the magnitude of said externally applied pressure.

2. An elastic diaphragm responsive to fluid pressure applied thereto, means for supporting it around its periphery so as to enable it to sustain said pressure, a rubber-like hydrostatic pressure transmitting pad having a face in engagement with one face of said diaphragm, rigid means completely surrounding the lateral boundary of said pad for restraining it in directions parallel to said face, said pad having an opposite face subjected to a distributed pressure, and electrical strain responsive means connected to the diaphragm to measure the surface strain thereof in response to said distributed pressure.

3. A load cell having a casing with a bore whose upper end is open and whose lower end is closed by a wall constituting a diaphragm, a load button extending into said bore through the open end thereof, a hydrostatic rubber-like pressure pad confined within and completely filling the space between the button and diaphragm whereby the diaphragm is uniformly subjected to load transmitted from the button through the hydrostatic pad, and electrical strain responsive means connected to the diaphragm to measure the surface strains induced therein in response to a load applied to the button.

4. The combination set forth in claim 3 further characterized in that the casing has a recess beneath the closed end of the bore thereby to form the diaphragm in spaced relation to the lower end of the casing, and said strain-responsive means being disposed within said recess on the lower side of said diaphragm.

5. The combination set forth in claim 3 further characterized in that the button is radially spaced inwardly of said bore, and means are provided for preventing the hydrostatic pad from entering said space.

6. A transducer comprising, in combination, a casing with a cavity having a bottom constituting a diaphragm and a fixed wall surrounding the edge of the diaphragm and fixed thereto to restrain movement of such edge, a rubber-like pad completely filling said cavity and having one face engaging one side of the diaphragm and the opposite face of the pad being subjected to an applied distributed pressure which is transmitted with substantially hydrostatic pressure action to the diaphragm thereby to flex the same in response to the applied pressure, and electrical strain responsive means connected to the diaphragm to measure the surface strains induced therein in response to the applied pressure.

References Cited in the file of this patent
UNITED STATES PATENTS

| | | |
|---|---|---|
| 2,360,886 | Osterberg | Oct. 24, 1944 |
| 2,400,467 | Ruge | May 14, 1946 |
| 2,477,507 | Africano | July 26, 1949 |
| 2,488,347 | Thurston | Nov. 15, 1949 |
| 2,568,940 | Wolf | Sept. 25, 1951 |
| 2,868,570 | Hines et al. | Jan. 13, 1959 |